United States Patent [19]

Bonnet et al.

[11] Patent Number: 4,731,829
[45] Date of Patent: Mar. 15, 1988

[54] CIRCUIT FOR DETECTING CURRENT VARIATIONS

[75] Inventors: Yves A. Bonnet, Saint Laurent du Var; Christian Jacquart, Gattieres, both of France

[73] Assignee: International Business Machines Corp., Armonk, N.Y.

[21] Appl. No.: 30,263

[22] Filed: Mar. 24, 1987

Related U.S. Application Data

[63] Continuation of Ser. No. 744,181, Jun. 13, 1985, abandoned.

[30] Foreign Application Priority Data

Jun. 20, 1984 [EP] European Pat. Off. ........ 84430019.4

[51] Int. Cl.⁴ ............................................ H04M 3/22
[52] U.S. Cl. ..................................... 379/382; 379/377
[58] Field of Search ............... 379/377, 382, 324, 413; 324/123 C, 126, 123 R, 76 R

[56] References Cited

U.S. PATENT DOCUMENTS

| | | | |
|---|---|---|---|
| 3,835,258 | 9/1974 | Le Cardonnel | 379/382 X |
| 4,127,747 | 11/1978 | Levi | 379/382 X |
| 4,287,393 | 9/1981 | Reuvekamp | 333/170 |
| 4,429,186 | 1/1984 | Gartner | 379/342 |
| 4,454,477 | 6/1984 | Joffe | 328/149 |
| 4,490,580 | 12/1984 | Nagashima | 379/379 |
| 4,524,246 | 6/1985 | Meza | 379/377 |
| 4,591,663 | 5/1986 | Sullivan | 455/602 |

Primary Examiner—Jin F. Ng
Assistant Examiner—R. Vaas
Attorney, Agent, or Firm—John B. Frisone

[57] ABSTRACT

The circuit of the present invention detects variations of a current $I_L$ flowing in a telephone line LL. A low-value resistor r is connected in series with line LL. A constant voltage generator is connected across this resistor. The current Is applied to resistor r by the contant voltage generator varies as a function of $I_L$. This being so, a measurement of the variations of Is will reflect variations of $I_L$ and, therefore, can be used to detect both amplitude and directional variations of $I_L$.

4 Claims, 6 Drawing Figures

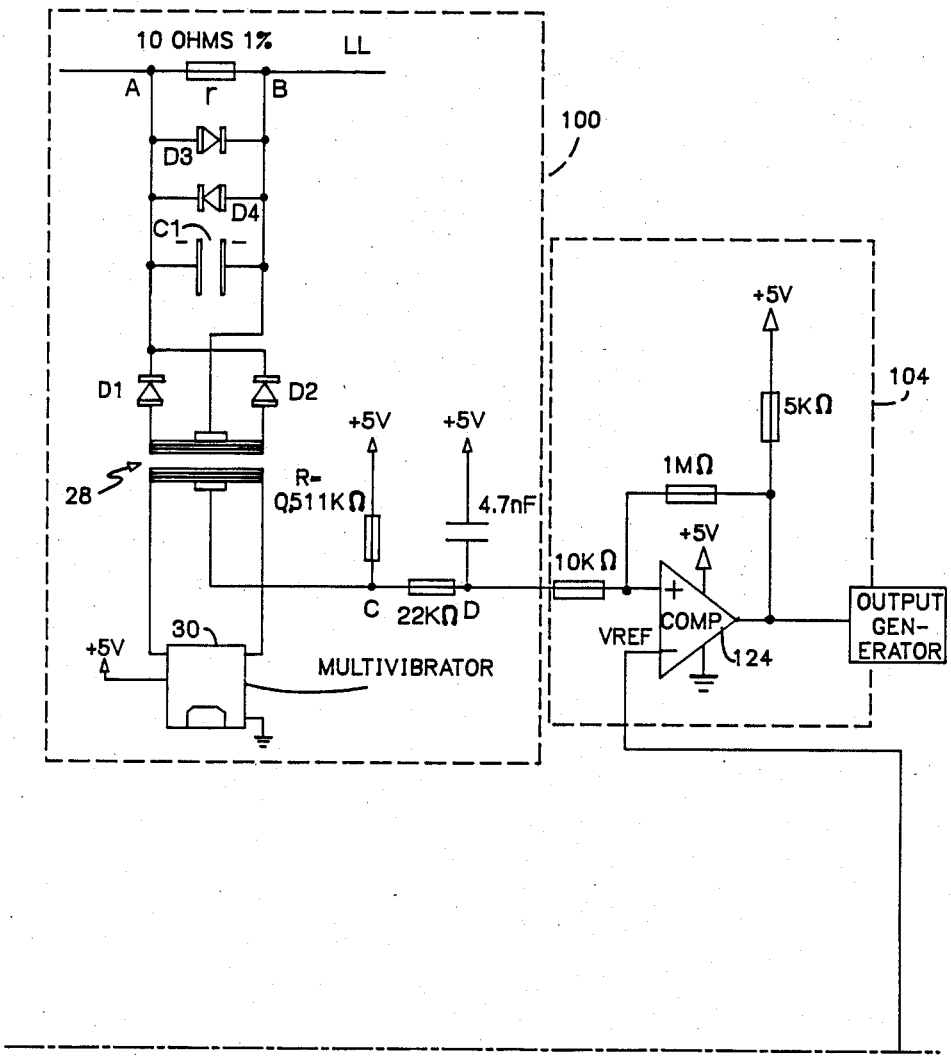

CIRCUIT FOR DETECTING CURRENT VARIATIONS

This is a continuation of copending application Ser. No. 744,181 filed on June 13, 1985, now abandoned.

BACKGROUND ART

This invention relates to a device for detecting the current flowing in a circuit such as a transmission line. The invention relates more particularly to a device for detecting the off-hook condition of a telephone through the detection of DC current variations occurring on the telephone line.

It is often necessary to detect the off-hook condition of a telephone in order, for example, to actuate a counter used to record the duration of telephone conversations between subscribers, or for various other reasons. More generally, it may be useful to detect certain changes in the value of the current flowing in a telephone line. This can be done by simply inserting an impedance in series with the line and measuring the voltage variations across that impedance. However, this solution raises a number of difficulties in practice. One of these is due to the fact that the added impedance increases the line impedance as seen at the output of the telephone exchange to which the called subscriber is connected, making it necessary, in order to comply with the standards established in relation to the operation of the exchange, to shorten the lines connectable thereto, thereby reducing the extent of the geographical area serviced by that exchange, which is a disadvantage. For example, some telephone lines have an impedance of 120 ohms/km. To comply with existing standards, the total impedance of the line connected to the exchange must be lower than a pre-established value, which limits the length of the line that may be used, hence the radius of the area that may be serviced by the exchange. To insert an additional 100 ohms in series with the line in order to measure the current flowing therein would decrease the length of said radius by close to one km, which is not acceptable.

Also, the circuit using the line current detection information must be dielectrically isolated from that line.

Opto-electronic couplers have been used as a means of resolving this type of problem. In addition to the fact that the light-emitting diode used in such cases causes the line voltage to drop by 1.4 volt, the use of such couplers may entail cost and reliability problems.

SUMMARY OF THE INVENTION

This invention provides a device which can reliably measure current variations in a circuit, even though it involves inserting a low-value impedance in series with the circuit.

More precisely, the invention relates to a device for detecting variations of the current flowing in a circuit, through the use of an impedance placed in series with said circuit, a generator which applies a constant voltage across said impedance, and means for measuring variations of the current supplied by said generator.

As will become apparent from the following description, the detector of the present invention can be used for detecting current variations in a telephone line while causing minimal interference with the operation thereof.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a view showing how FIGS. 3A and 3B are arranged. FIGS. 3A and 3B illustrate an improved embodiment of the invention.

DETAILED DESCRIPTION OF THE INVENTION

Figure 1:
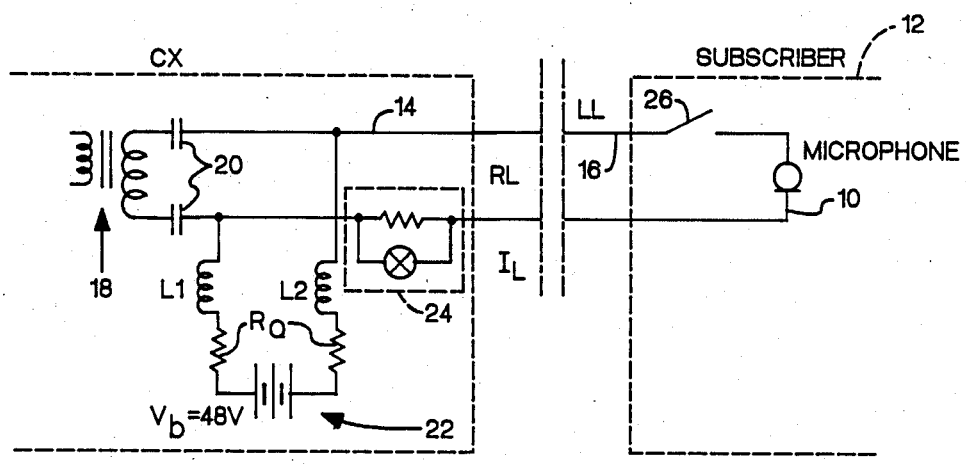
FIG. 1 shows an exemplary circuit in which the invention finds application.

Referring now to FIG. 1, a simplified circuit is shown which illustrates the invention in the context of a telephone installation. The microphone 10 in the telephone handset of a subscriber 12 is connected to a public exchange or central office (CX) 14 by a telephone line (LL) 16. The interface circuit at the output of central office 14 includes a low-frequency (LF) transformer 18 called line transformer, coupling capacitors 20, and a power supply 22 schematically shown as a 48-volt battery $V_b$ connected to line LL through a resistor $R_0$ and inductors L1 and L2. This battery serves in particular to generate a DC line current that is fed to microphone 10. The voice signals generated by microphone 10 are sent to the destination telephone (not shown) through LF transformer 18. Inductors L1 and L2 create a high AC impedance that prevents the LF signals from microphone 10 from being lost in the circuitry of power supply 22. The circuit of the present invention, which measures the current $I_L$ in telephone line LL, is schematically shown at 24. Actually, it is desired here to detect the variations of current $I_L$ that occur when subscriber 12 picks up his handset, thereby causing switch 26 to close. The impedance of line LL is designated $R_L$.

When the circuit is in a quiescent state, that is, when no voice current is generated by microphone 10 and in the absence of measuring devices such as 24, the current $I_L$ flowing in the line equal to:

$$I_L = \frac{V_b}{\Sigma R} = \frac{V_b}{R_O + R_L + R_{TS}}$$

where $R_{TS}$ is the resistance due to microphone 10.

A correct operation of the telephone installation is obtained when $I_L$ varies by more than 10 mA, regardless of the direction in which the current flows, to indicate an off-hook condition of the telephone of subscriber 12 is, the higher the value of $R_L$ (assuming that the cross-section of the telephone line conductors is the same for all users). Knowing $V_b$, $R_O$ and $R_{TS}$, one can determine the maximum value that $R_L$ can take on, with the value of $R_L$ still being within specifications. Knowing the characteristics of the line being used, one can determine the maximum allowable length of the line between central office 14 and subscriber 12 connected thereto.

Any resistor inserted in series with the line circuit will adversely affect the maximum allowable distance between the central office and a subscriber. It is, therefore, necessary to minimize the impedance r inserted in series with line LL by measuring device 24. In the embodiment described hereafter, a 10-ohm resistor r is used. Assuming that line LL is of a type such that it exhibits an impedance of 120 ohms/km, the effect of inserting line current detector 24 will be to shorten by 100 m the radius of the area serviced by central office 14.

Figure 2:
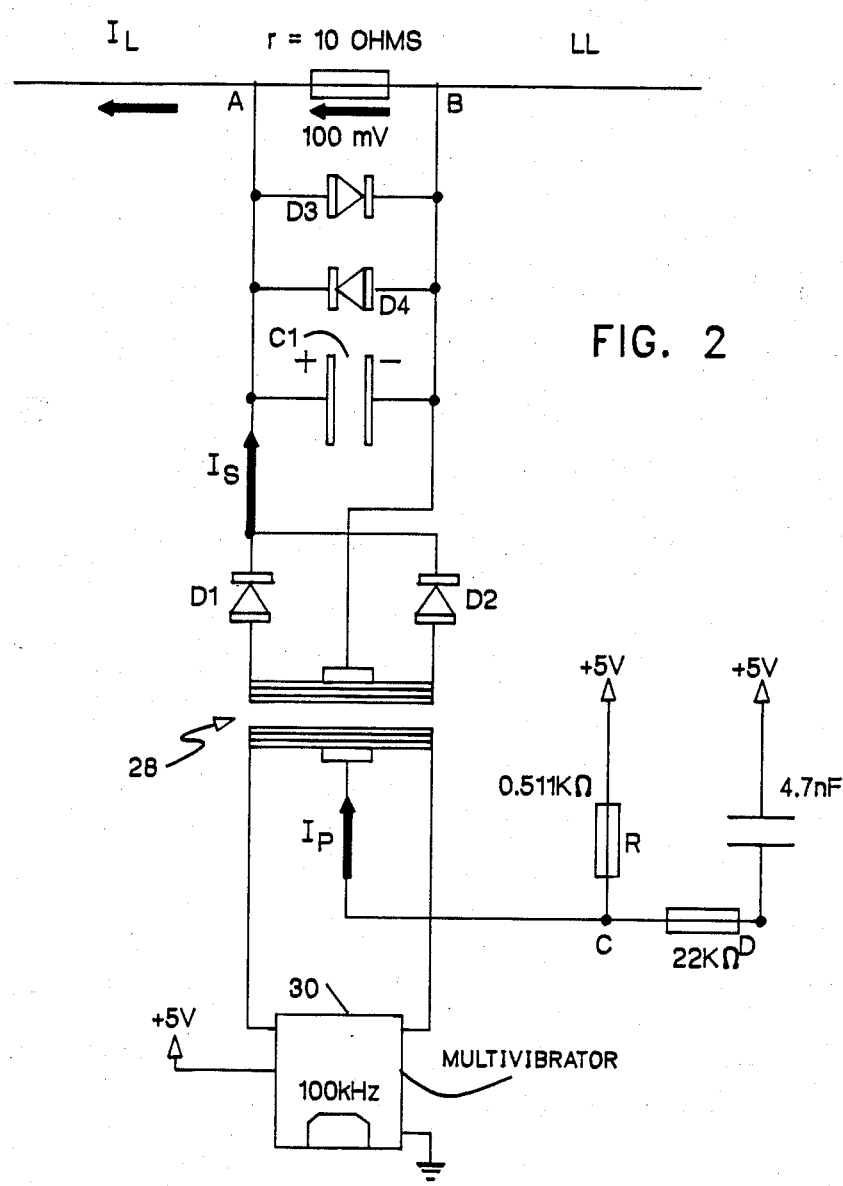
FIG. 2 illustrates an embodiment of the invention.

Referring now to FIG. 2, an embodiment of detector 24 is shown. Resistor r, which has a selected value of 10 ohms and is shown at top of FIG. 2, is connected in series with one of the conductors in line LL. The circuit of the invention will act as a voltage generator supplying a predetermined voltage of, for example, 100 mV between terminals A and B of resistor r. Accordingly, the current supplied by the voltage generator will vary according to the value of the line current $I_L$ through resistor r. The voltage supplied by the generator is in fact derived from a high-frequency (HF) wave (of 100 KHz, for example) which is generated at the primary of a HF transformer 28, rectified at the secondary thereof, and filtered before being applied to terminals A and B. The HF wave is obtained by connecting across the primary of transformer 28 a switching circuit or multivibrator (MV) 30 which alternately connects the leads of the primary to ground at a frequency of 100 KHz.

Also, the center tap of the primary is connected to one of the terminals of a DC voltage source through a resistor R of 511 ohms, the chosen value of the voltage supplied by said source being 5 volts. The desired information, that is, the information denoting the off-hook condition of the telephone handset (not shown) connected to line LL, will be available at C, as explained hereafter. As a precaution, a low-pass filter, intended to eliminate the switching noise and comprising a 22-kilohm resistor and a 4.7-nF capacitor, is provided at C. The desired information will be obtained at D. The secondary of transformer 28 drives a full-wave rectifier comprising two diodes D1 and D2. The center tap of the secondary is connected to terminal B. The output from the rectifier drives a filter capacitor C1 whose electrodes are respectively connected to points A and B. Lastly, two diodes D3 and D4 are connected alongside each other, as shown, to the electrodes of capacitor C1, that is, the cathode of D3 and the anode of D4 being connected to the same electrode of C1, and the anode of D3 and the cathode of D4 being connected to the other electrode of C1.

In operation, when the telephone handset (not shown) is on-hook, the current $I_L = 0$. Accordingly, the secondary of transformer 28 supplies 10 mA from the rectified and filtered HF wave, generating a voltage of 100 mV across terminals A, B of resistor r. When the handset is lifted from its cradle, a line current $I_L$ is supplied by battery $V_b$ (not shown) and flows in resistor r. The current Is at the secondary of transformer 28 may be defined as:

$$Is = \frac{V_r}{r}$$

$$= \frac{V_A - V_B}{r}$$

$$= \frac{E_s - rI_L}{r}$$

$$= \frac{E_s}{r} - I_L$$

with Is always equal to or greater than 0 because of the presence of diodes D1 and D2.

There are two possibilities:

1. positive current:

example:

$I_L = +20$ mA gives Is=0 mA (actually, $-10$ mA limited to 0 mA)

2. negative current:

example:

$I_L = -20$ mA $I_s = +30$ mA

It should be noted that the primary current $I_p$ is limited to 10 mA because of the presence of 511-ohm resistor R.

This current variation is reflected back to the primary of transformer 28, and consequently affects the current through 511-ohm resistor R, thereby reacting a voltage variation at points C and D, i.e. between any one of these points and ground.

In other words, the circuit of the invention uses a DC/DC voltage converter, involving the generation of a HF wave, and the converter generates a relatively constant DC voltage. In the instance of the circuit described above, this voltage is about 100 mV. By connecting this converter across resistor r, which is connected in series with line LL, the current supplied by the converter is caused to combine with line current $I_L$ to keep the voltage across r constant. Thus, variations of $I_L$ will entail variations of current Is fed to the secondary of transformer 28. Such variations of Is will be reflected back to the primary of transformer 28 and therefore affect the current $I_p$ through resistor R. These are the variations that will be detected at points C and D. By collecting the information being sought at either of these points, the desired isolation between the line and the device for detecting that information is provided by transformer 28. Also, since the HF signal being used has a frequency of 100 KHz, any residual component sent over line LL would have no adverse effect on the telephone connection as it would lie outside the telephone bandwidth.

It should further be noted that the desired information can be detected regardless of the direction of current $I_L$. As will later be seen, the circuit of the invention can also detect in a very simple manner an inversion of the direction in which the current flows, indicating, for example, an inversion of the poles of battery $V_b$.

In practice, the PTT allow that a leakage current may exist on line LL, even though the associated handset is on-hook. Accordingly, the off-hook condition of the handset can be detected by determining that the value of line current $I_L$ (regardless of direction) exceeds a predetermined value, for example:

$I_L \geq 10$ mA

Lastly, the information detected is independent of changes that the circuit components may undergo in the course of time, which is desirable.

Figure 3B:
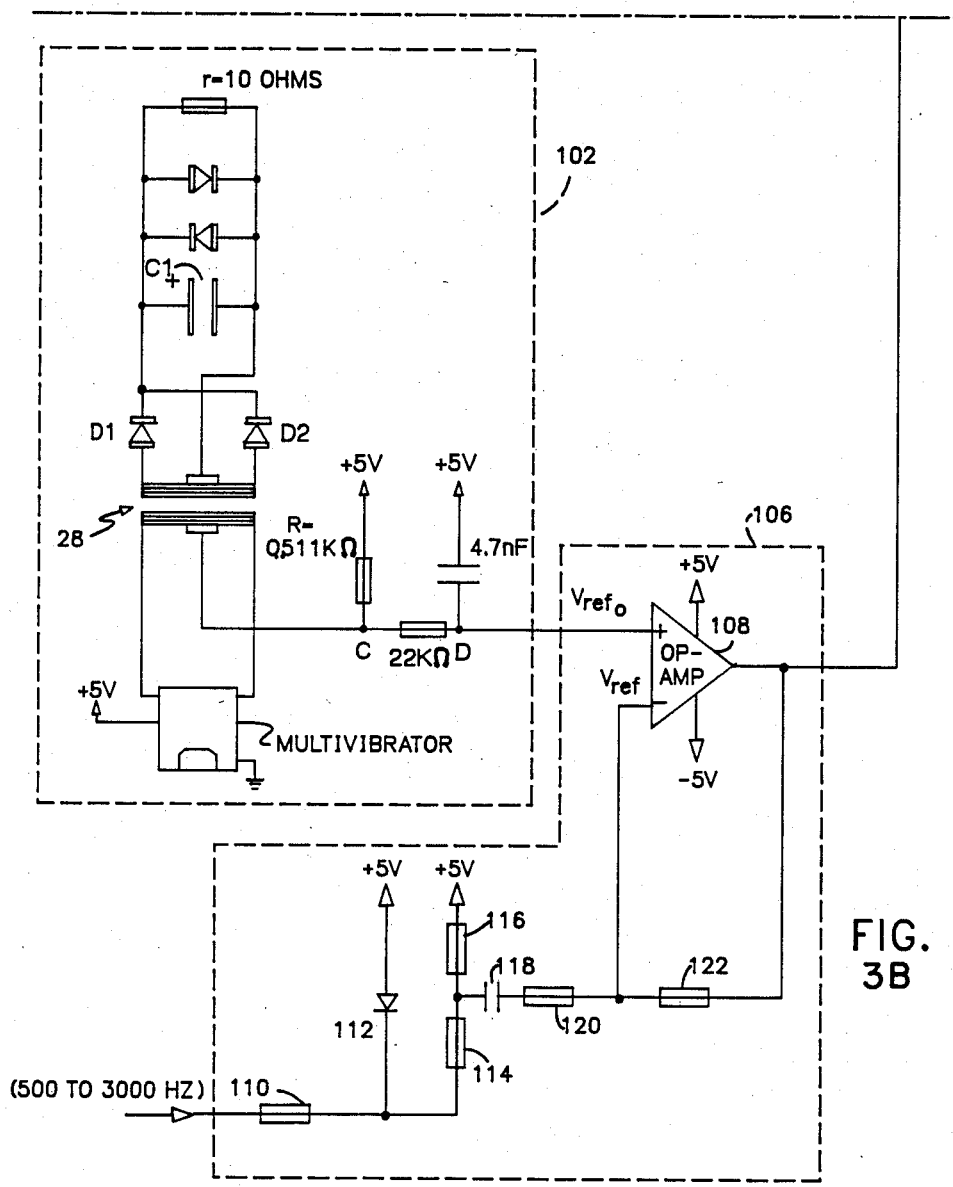

Referring now to FIG. 3, there is shown a circuit which allows all of the above objects to be attained through the use of a reference circuit similar to the DC/DC converter of FIG. 1. The circuit of FIG. 3 is essentially comprised of a circuit 100 identical to that of FIG. 1; a reference circuit 102 identical to that of FIG. 1, except for the fact that the 10-ohm resistor r is not inserted in the telephone line LL; and a comparator 104. A fourth circuit, 106, which is described below, is also shown in FIG. 3.

Circuit 106 comprises an operational amplifier 108 whose non inverting (+) input is connected to output D' of reference circuit 102, and whose inverting (−) input is connected to an AC voltage generator (not shown) whose frequency is, in this example, in the range of 500 to 3000 Hz. The output of the generator is connected to one of the terminals of a resistor 110, which has its other terminal connected to a DC voltage source (+5 volts) through a couple of resistors 114, 116 and to the (−) input of amplifier 108 through resistor 114, a capacitor 118 and a resistor 120. A resistor 122 establishes a feedback circuit between the output of amplifier 108 and the (−) input thereof. Thus, circuit 106 acts as an adder which forms the sum of an AC signal Vref supplied by the generator (not shown) whose frequency is in the range of 500 to 3000 Hz, and the voltage Vref0 obtained at output D' of circuit 102. Circuit components 110 to 122 should be selected so that the peak-to-peak amplitude of Vref will be twice the amplitude of the voltage variation that would appear at point D of circuit 100 given a 10 mA variation of line current $I_L$. Note that if the PTT requirements were different, that is, if the information to be detected were required to differ from that corresponding to a minimal variation of ±10 mA of the line current, then the amplitude of voltage Vref should be selected accordingly.

Thus, there is obtained at the output of operational amplifier 108 a reference voltage VREF such that:

$$VREF = Vref0 + Vref$$

Circuit 104 is a conventional comparator that includes a voltage comparator 124 whose (−) input is connected to the output of circuit 106 and receives the VREF signal, and whose (+) input is connected to point D of circuit 100 and receives the voltage VD to be analyzed.

Figure 4:
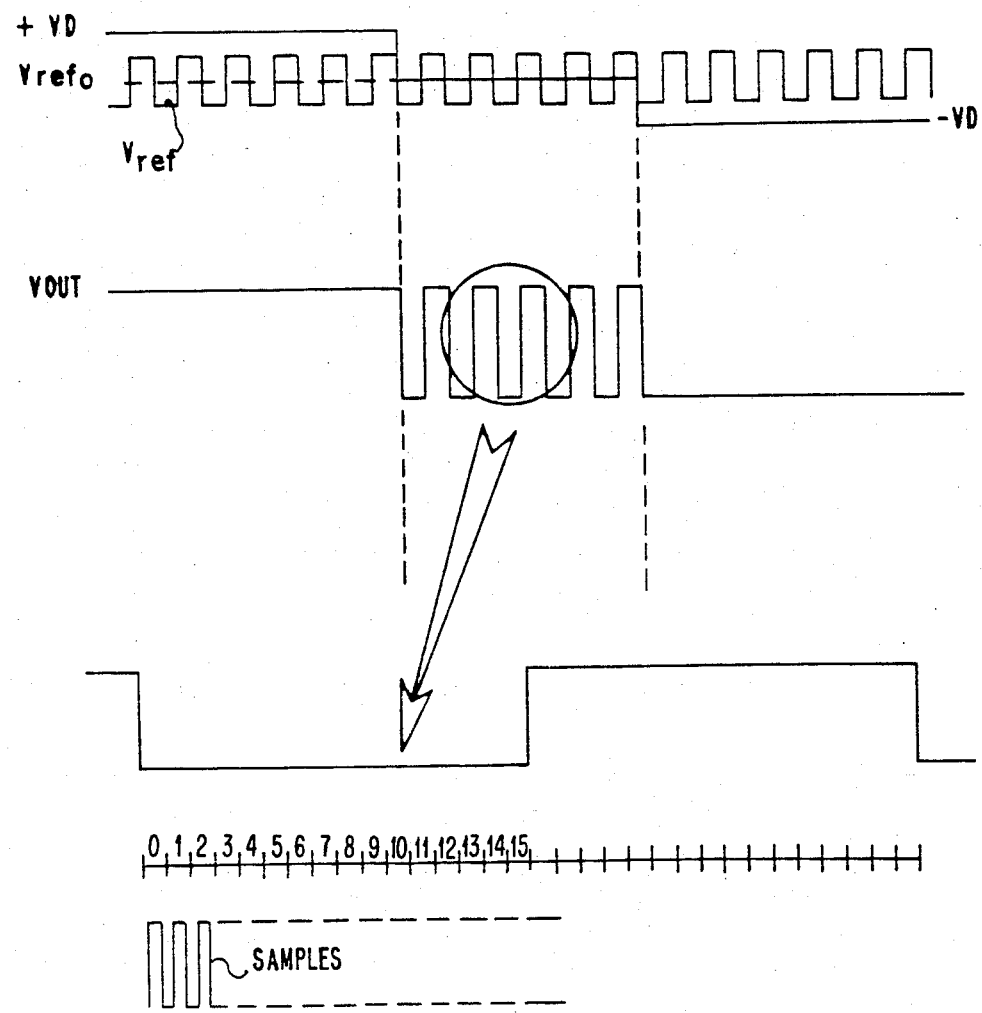
FIG. 4 is a diagram illustrating the operation of the device of FIG. 3.

Referring now to FIG. 4, the various signals to be analyzed are shown. The voltages fed to comparator 104 are shown at top. Voltage VREF is represented as a square wave Vref oscillating about a value Vref0. Voltage VD is represented so as to illustrate the three different possibilities, namely, the two extreme cases in which the relative amplitude of VD exceeds the peak value of VREF but can be positive (+VD) or negative (−VD). This reflects the fact that the line current $I_L$ can flow from A to B or from B to A since the direction of $I_L$ is dependent on the polarities of source $V_b$ (see FIG. 1). On the other hand, the direction of Is (see FIG. 2) does not change. Thus, current Is will either increase or decrease to reflect the off-hook condition of the subscriber's telephone (see FIG. 1).

Lastly, the central portion of the waveform shown at top in FIG. 4 represents VD where the telephone is on-hook ($I_L = 0$).

The second line of FIG. 4 shows the signal (VOUT) obtained at the output of comparator 124 when the input signals applied thereto are as shown at top. At each end of the waveform shown, VOUT remains at a constant logic level corresponding to the off-hook condition of the telephone, and in addition this logic information is either positive or negative. The sign reflects the polarity of the source $V_b$ (see FIG. 1). Thus, this logic information can be used either to determine said polarity or to detect a possible permutation of the polarities of $V_b$ during operation. An enlargement of the central portion of the waveform appears in the next line of FIG. 4 to show how it can be processed by logic means. The square wave is sampled to be analyzed by data processing means (not shown) to determine whether some portion of VOUT is a square wave, as this would indicate the on-hook condition of a subscriber's telephone. This would prevent off-hook conditions from being erroneously detected due to the presence of noise on the line.

Finally, a given reference circuit (102, 106) can of course be used in conjunction with several lines LL or circuits (100).

While the invention has been particularly shown and described with reference to a preferred embodiment thereof, it will be understood by those skilled in the art that numerous changes in form and detail may be made therein without departing from the spirit and scope of the invention.

What is claimed is:

1. A circuit for detecting current variations in a telephone line circuit produced when the telephone set connected to the line circuit goes off-hook comprising:
   a first resistive load, connected in series with the telephone set, in the line circuit;
   a high frequency (HF) generator for generating an HF wave signal;
   a transformer having a centertapped primary winding connected to said HF generator and a secondary winding;
   a rectifier connected to said secondary winding of said transformer;
   a filter circuit connected to said rectifier and said first resistive load;
   means for connecting the centertap of said primary winding to a source of reference voltage through a resistive load; and
   means connected to said second resistive load for detecting any voltage variations across said second resistive load corresponding to any said varitions of current flowing through said telephone line circuit and said first resistive load connected therein.

2. A detecting circuit according to claim 1 wherein said means for detecting the voltage variation across said second resistive load includes a lowpass (LP) filter connected to said second resistive load.

3. A detection circuit according to claim 2 wherein said means for detecting the voltage variation across said second resistive load also includes:
   a comparator having a first input and a second input;
   means for connecting said first input to said LP filter connected to said second resistive load;
   a second voltage reference source; and means for connecting said second comparator input to said second voltage reference source.

4. A detection circuit according to claim 3 in which said second voltage reference includes;
   a third resistive load;
   a second high frequency generator for generating an HF wave signal;
   a second transformer having a centertapped primary winding connected to said second HF generator and a secondary winding;
   a second rectifier connected to said secondary winding of said second transformer, a second filter circuit connected to said second rectifier and said third resistive load;
means for connecting the centertap of said primary winding of said second transformer to a source of reference voltage through a fourth resistive load and
a second low pass (LP) filter means connecting the fourth resistive load to the said second comparator input.

* * * * *